US012718231B2

(12) United States Patent
Bimolaksono et al.

(10) Patent No.: US 12,718,231 B2
(45) Date of Patent: Aug. 25, 2026

(54) CONVERSION OF CRYPTOCURRENCY TRANSACTIONS TO CENTRAL BANK DIGITAL CURRENCY FOR MERCHANT SYSTEMS

(71) Applicant: American Express Travel Related Services Company, Inc., New York, NY (US)

(72) Inventors: Lucky Bimolaksono, Hurlstone Park (AU); Dean Ernest Arthur Nicolson, Wattle Grove (AU)

(73) Assignee: American Express Travel Related Services Company, Inc., New York, NY (US)

( * ) Notice: Subject to any disclaimer, the term of this patent is extended or adjusted under 35 U.S.C. 154(b) by 215 days.

(21) Appl. No.: 18/161,271

(22) Filed: Jan. 30, 2023

(65) Prior Publication Data

US 2024/0257111 A1 Aug. 1, 2024

(51) Int. Cl.
*G06Q 20/38* (2012.01)
*G06Q 20/10* (2012.01)
(Continued)

(52) U.S. Cl.
CPC ......... *G06Q 20/381* (2013.01); *G06Q 20/108* (2013.01); *G06Q 20/20* (2013.01);
(Continued)

(58) Field of Classification Search
CPC .... G06Q 20/381; G06Q 20/108; G06Q 20/20; G06Q 20/3678; G06Q 20/3825; G06Q 20/389; G06Q 20/401; G06Q 20/42
See application file for complete search history.

(56) References Cited

U.S. PATENT DOCUMENTS 7,832,646 B1 * 11/2010 Leason ................ G06Q 20/352 235/492
10,055,715 B1 * 8/2018 Grassadonia .......... G06Q 20/36
10,614,450 B1 * 4/2020 Templeton ........... G06Q 20/354
(Continued)

OTHER PUBLICATIONS

Mikael Asplund, et al., In-Store Payments Using Blockchain, Apr. 2, 2018, IEEE, pp. 1-6 (Year: 2018).*

*Primary Examiner* — Nilesh B Khatri
(74) *Attorney, Agent, or Firm* — Thomas | Horstemeyer, LLP

(57) ABSTRACT

Disclosed are various embodiments for converting cryptocurrency to central bank digital currency for transactions. In one example, among others, a system comprises a computing device and machine-readable instructions stored in the memory. The instructions cause the computing device to identify a cryptocurrency request for a pending transaction of an item, in which the pending transaction comprises a token. The instructions cause the computing device to determine a device identifier associated with the token and determine a cryptocurrency amount for the item. A user interface on a client device is activated in order to request an acceptance of the cryptocurrency amount. A withdrawal instruction is transmitted to a cryptocurrency exchange for the cryptocurrency amount on behalf of a user. In this non-limiting example, a blockchain transfer of a transaction price for the item with a central bank digital currency blockchain network is transmitted.

20 Claims, 7 Drawing Sheets

(51) Int. Cl.
*G06Q 20/20* (2012.01)
*G06Q 20/36* (2012.01)
*G06Q 20/40* (2012.01)
*G06Q 20/42* (2012.01)

(52) U.S. Cl.
CPC ..... *G06Q 20/3678* (2013.01); *G06Q 20/3825* (2013.01); *G06Q 20/389* (2013.01); *G06Q 20/401* (2013.01); *G06Q 20/42* (2013.01)

(56) References Cited

U.S. PATENT DOCUMENTS 10,621,561 B1 * 4/2020 Brock .................. G06Q 20/381
11,315,113 B1 * 4/2022 Kurennykh .......... G06Q 20/204
2011/0218849 A1 * 9/2011 Rutigliano ......... G06Q 30/0224 705/16
2015/0262173 A1 * 9/2015 Durbin ................ G06Q 20/381 705/64
2015/0365283 A1 * 12/2015 Ronca .................. G06Q 20/065 705/71
2016/0092880 A1 * 3/2016 Klingen ................. G06Q 20/42 705/16
2017/0237554 A1 * 8/2017 Jacobs .................... G06F 21/64 713/171
2018/0025442 A1 * 1/2018 Isaacson ............ G06Q 30/0613 705/26.62
2018/0150816 A1 * 5/2018 Liu ...................... G06Q 20/202
2018/0332011 A1 * 11/2018 Gray ..................... H04L 9/0841
2019/0236593 A1 * 8/2019 Vorobyev ........... G06Q 20/3829
2021/0118052 A1 * 4/2021 Walser ............... G06Q 20/3825
2021/0398211 A1 * 12/2021 Maathur .............. G06Q 20/401
2022/0076315 A1 * 3/2022 Angeli ............... G06Q 30/0633
2022/0292496 A1 * 9/2022 Yan .................... G06Q 20/1085
2023/0297995 A1 * 9/2023 Cline ................... G06Q 20/227 705/44
2023/0368159 A1 * 11/2023 Mathew ............... G06Q 20/367
2024/0202815 A1 * 6/2024 Nonni .................. G06Q 20/065

* cited by examiner

CONVERSION OF CRYPTOCURRENCY TRANSACTIONS TO CENTRAL BANK DIGITAL CURRENCY FOR MERCHANT SYSTEMS

BACKGROUND

Cryptocurrency continues to grow in acceptance among the public. In fact, multiple types of cryptocurrencies are now available. Because of the growing level of acceptance, some businesses have started to accept cryptocurrency as a method of payment from customers and started to compensate employees in cryptocurrency. However, businesses still have several concerns using cryptocurrencies as a medium for exchanging goods and services.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
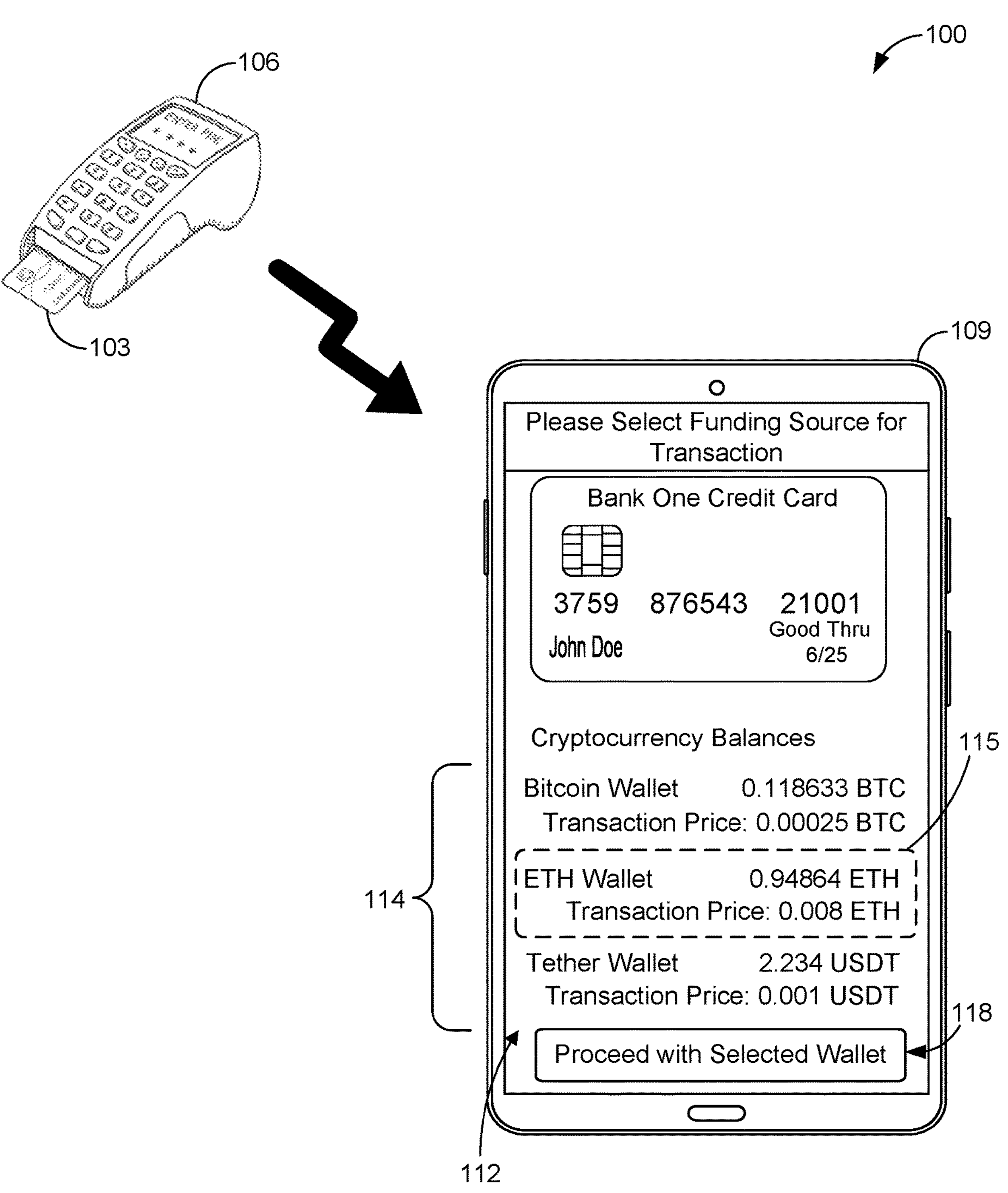
FIG. 1 is a drawing depicting an example transaction scenario according to various embodiments of the present disclosure.

The embodiments of the present disclosure relate to converting cryptocurrency to a central bank digital currency (CBDC) for transactions conducted by merchant systems. Overtime, cryptocurrency has continued to grow in acceptance among the public. Multiple cryptocurrencies are now available and have established a following. New cryptocurrencies continue to emerge while some existing cryptocurrencies unpredictably collapse. Nevertheless, businesses have started to accept cryptocurrency as a method of payment from customers.

However, businesses still have several concerns using cryptocurrencies as a medium for exchanging goods and services. Some merchants are hesitant to accept cryptocurrency as a method of payment because of the volatile nature of cryptocurrency. For example, the volatile value (e.g., price conversion to fiat $US) of cryptocurrencies is one reason for merchant concern. As another reason, cryptocurrencies have deterministic settlements at different speeds and different levels of certainty. Additionally, merchants are hesitant to accept cryptocurrency because it may require investing in new point of sale terminal hardware and/or additional software for online transactions. This issue becomes even more challenging if merchants desire to accept various kinds of cryptocurrency.

Various embodiments of the present disclosure relate to accepting cryptocurrency on behalf of a merchant for a transaction and providing payment to the merchant in the form of a central bank digital currency (CBDC) during the settlement process. First, by accepting cryptocurrency on behalf of merchants, the merchant can continue to use existing point of sale (POS) devices. Thus, the embodiments enable existing POS devices of merchants to be able to accept various cryptocurrencies for transactions in physical retail stores and for online transactions. In some embodiments, a first CBDC can be accepted at a POS device and the first CBDC can be converted to a second CBDC for a merchant system for transaction. Thus, a first CBDC can be used as funding source for a transaction occurring in country or geographic area that supports a second CBDC for a merchant.

Further, a CBDC can refer to a digital currency issued by a central bank of a government. In some scenarios, a CBDC can be implemented using a database managed by a central bank of a government organization. The database may constitute a blockchain or distributed ledger. Thus, instead of accepting and holding cryptocurrency, the embodiments allow for merchants to receive their transaction proceeds in CBDC. This aspect provides various advantages for merchants because a CBDC would generally be a more stable form of currency or cryptocurrency since it is backed by a government entity. For example, the CBDC can be regulated as the "legal tender" for the operations, reporting, and taxes of an area (e.g., country, a territory, etc.).

Additionally, in some examples, various embodiments can address the volatile nature of cryptocurrency by improving the speed of authorizing and settling transactions. With traditional payment processing, a merchant can provide a batch of payment card transactions at the end of one or more business days to an issuing bank. After the issuing bank approves the batch of payment card transactions, the issuing bank transfers the transaction proceeds to an acquiring bank. Then, the acquiring bank deposits the transaction proceeds into a financial account of the merchant. With batch processing, merchants can typically receive their transaction proceeds within two to three days from sending the batch of payment card transactions to the issuing bank.

In contrast, these embodiments are directed to real-time payment processing of merchant transactions. Real-time payments not only improve cash-flow, but make cryptocurrency a viable payment option. If cryptocurrencies transactions were processed using the previously described approaches, the value of the cryptocurrency used for the payment could change significantly during that time. For example, if a first transaction is not settled and finalized on-chain (e.g., a blockchain), then a user could spend the same funds again quickly and write this second transaction prior to the settlement of the first transaction. As such, the first transaction could take multiple days (e.g., two days) due to batch processing. During the batch processing, the transaction funds may be gone because of the second transaction and the wallet could be empty on the day of final settlement for the first transaction, which could result in the merchant associated with the first transaction losing the funds.

Real-time payments using the various embodiments of the present disclosure mitigate these concerns. As such, instead of aggregating multiple transactions for processing later, the embodiments are directed to processing and settling each transaction in real-time or near real-time. Thus, the merchants can receive their transaction proceeds in significantly less time. As such, the settlement time is reduced from two to three days to real-time or near-time receipt of transaction proceeds.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

As illustrated in FIG. 1, shown is a drawing depicting an example transaction scenario 100 of a user using a payment instrument 103 to facilitate an acceptance of a cryptocurrency for a transaction at a point of sale (POS) device 106. In this example scenario, a user has approached the POS device 106 in order to purchase an item. After the item has been scanned, the POS device 106 can display a total price due for the transaction. The user can select to make a credit card payment at the POS device 106. The POS device 106 can indicate that it is ready to accept a payment card. The user can tap, swipe, or insert the payment instrument 103 into the POS device 106, as shown in FIG. 1.

The payment instrument 103 can be a payment card (e.g., debit card, credit card, gift card, loyalty point card, prepaid card, charge card), phone/digital wallet, wearable device, quick response (QR) code, biometric identifier (ID) or other suitable payment instruments. Additionally, the payment instrument 103 can represent a payment credential or an alias for a financial account of the user. The payment instrument 103 can be stored in a client device 109, a payment instrument 103 (e.g., a payment card), and other suitable payment mechanisms. In some non-limiting examples, the client device 109 can be a smart phone device, a tablet device, a wearable device (e.g., a smart watch, smart glasses, an activity tracking device, etc.), and other suitable client devices. In at least some embodiments, the POS device 106 can include various detectors, such as a camera, a light spectrum scanner, a motion detector, a microphone, radio frequency (RF) detectors, or other type of detectors. Such detectors could be used to recognize payment instruments 103. In some embodiments, the detectors of a POS device 106 can detect a payment instrument over near field communication (NFC) radio frequencies. In another embodiment, a POS device 106 can detect a quick response (QR) code being presented using a visual detector, such a camera, a visual spectrum scanner, or other detector.

The POS device 106 can receive a payment token from the payment instrument 103 and include the payment token in an authorization request. The POS device 106 can transmit the authorization request to a remote computing device of an issuer (e.g., a financial service provider). The remote computing device can identify the payment token as being associated with a user profile. The user profile can have a configuration setting for triggering a request for a selection of a funding source from a client device 109 for the transaction. The remote computing device can transmit an activation instruction to a mobile application associated with the issuer installed on the client device 109. The activation instruction can cause the client device 109 to display a user interface 112 for selecting a funding source (e.g., a financial account) for the transaction. In the illustrated embodiment, the user interface 112 has been configured to display multiple funding sources 114 which are cryptocurrency wallets in the illustrated example. Each cryptocurrency wallet listed includes a cryptocurrency balance for the user and a cryptocurrency transaction price in the particular cryptocurrency. The cryptocurrency transaction price is generated based at least in part on a cryptocurrency exchange rate, the transaction price (e.g., in U.S. dollars), and/or other factors. Some non-limiting examples of other factors can include blockchain related fees (e.g., gas prices), a margin/discount rate, and other suitable fees.

The user selects one of the cryptocurrency accounts, in which the selection 115 as indicated in FIG. 1. After the user clicks on the proceed button 118, the remote computing device can proceed with an approval stage in authorizing the transaction at the POS device 106 with the selection 115 of the cryptocurrency wallet. After the cryptocurrency wallet has been approved for the transaction, the remote computing device can debit the cryptocurrency transaction price from the cryptocurrency wallet at a cryptocurrency blockchain. In this non-limiting example, the settlement process can involve crediting the transaction price (e.g., in a digital currency) in a CBDC used by the merchant of the POS device 106.

In another example scenario, the user selection of a cryptocurrency account is omitted. Instead, prior to a transaction, the user can configure a default selection of a cryptocurrency account or other funding source. As such, during a transaction, a user does not have to interact and authorize each transaction. The default selection of the funding source can be used.

The embodiments of the present disclosure deviate from traditional payment processing because the embodiments can provide a real-time or near real-time ability to settle merchant transactions. In contrast, when using traditional payment processing networks such as the Automated Clearinghouse (ACH), the financial service providers can handle transactions in batches and the settlement process can take multiple days before the merchant receives its proceeds. Additionally, because of the improved speed for processing and settling merchant transactions, the embodiments can enable merchant systems to accept cryptocurrencies as a form of payment at a POS device with their existing POS devices 106.

Figure 2:
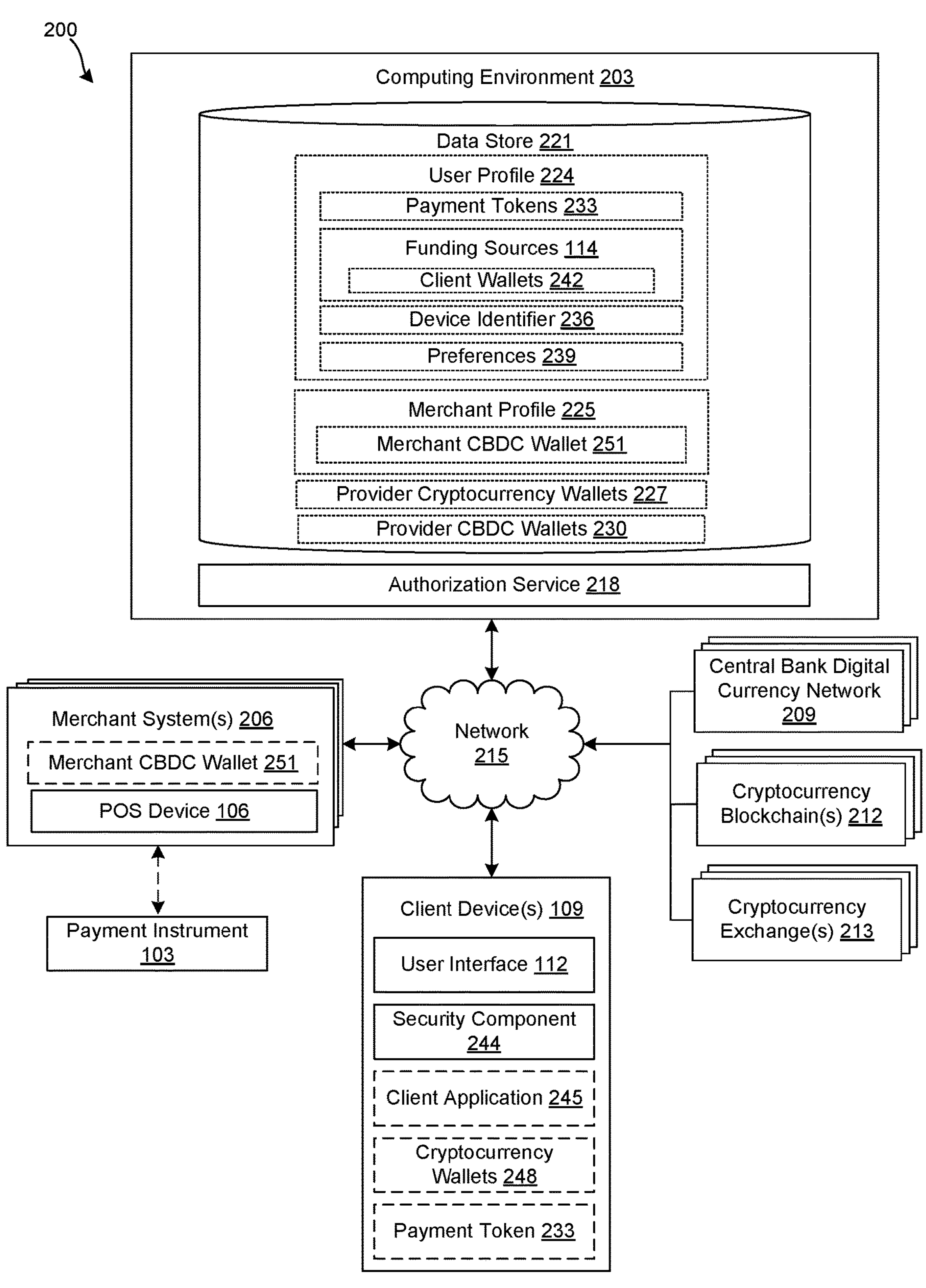
FIG. 2 is a drawing of a network environment according to various embodiments of the present disclosure.

With reference to FIG. 2, shown is a network environment 200 according to various embodiments. The network environment 200 can include a computing environment 203, a merchant system 206, a Central Bank Digital Currency (CBDC) network 209, a cryptocurrency blockchain 212, a cryptocurrency exchange 213, and the client device 109, which can be in data communication with each other via a network 215.

The network 215 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 215 can also include a combination of two or more networks 215. Examples of networks 215 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content. In some embodiments, the computing environment 203 can represent a remote computing device of a financial services provider, such as a retail bank, an issuing bank, an acquiring bank, or other suitable financial service providers.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

In some embodiments, the computing environment 203 can include a cryptography component, which can be implemented as a hardware component, as a software component, or a combination of hardware and software. The cryptography component can store confidential payment information, identity credentials, cryptographic data (e.g., private keys), and/or potentially other confidential data. In some embodiments, the cryptography component can include a computing device that is tamper resistant, in which the computing device includes a processor and memory. In some examples, the cryptography component can be a secure element, a cryptography chip, and other suitable cryptographic components.

Various applications or other functionality can be executed in the computing environment 203. The components executed on the computing environment 203 include an authorization service 218, and other applications, services, processes, systems, engines, or functionality not discussed in detail herein.

The authorization service 218 can be executed to facilitate the acceptance of cryptocurrency at merchant POS devices 106 and can be executed to convert cryptocurrency payments to a digital currency of a CBDC network 209 for merchant systems. Additionally, the authorization service 218 can be executed to receive authorization from the client device 109 to process a transaction at a POS device 106 from a cryptocurrency wallet.

Also, various data is stored in a data store 221 that is accessible to the computing environment 203. The data store 221 can be representative of a plurality of data stores 221, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 221 is associated with the operation of the various applications or functional entities described below. This data can include the user profile 224, the merchant profile 225, the provider cryptocurrency wallet(s) 227, the provider CBDC wallet(s) 230, and potentially other data.

The user profile 224 can represent a profile or account for a user. In some examples, the remote computing device (e.g., the computing environment 203) of a financial service provider can have a user profile 224 for each financial account holder. The user profile 224 can include contact information (e.g., name, address, phone number, etc.). Additionally, the user profile 224 can include payment tokens 233, funding sources 114, device identifiers 236, preferences, and other suitable user profile data.

The payment token 233 can represent a payment credential or an alias for a financial account of the user. The payment token 233 can be stored in a client device 109, a payment instrument 103 (e.g., a payment card), or other suitable payment mechanisms. In some non-limiting examples, the client device 109 can be a smart phone device, a tablet device, a wearable device (e.g., a smart watch, smart glasses, an activity tracking device, etc.), or other suitable client devices.

The funding sources 114 can represent one or more financial accounts that are managed or owned by the user. The funding sources 114 can include client wallets 242 (e.g., cryptocurrency wallets, a user account at the cryptocurrency exchange 213, local CBDC wallets, other CBDC wallets, etc.), credit card accounts, debit accounts, loyalty point accounts, gift card accounts, charge accounts, or other suitable financial accounts. In some examples, one or more funding sources 114 can be configured to be automatically assigned to certain transactions. For example, a particular user cryptocurrency wallet can be assigned as a funding source for a payment instrument 103 when used at a POS device 106, as illustrated in FIG. 1. In some examples, the funding sources 114 can include data associated with one or more client wallets 242. For example, the client wallets 242 can include an authorization token that permits the authorization service 218 to make withdrawals from a user account of a user at the cryptocurrency exchange 213. In some instances, the withdrawal causes the cryptocurrency exchange 213 to transfer cryptocurrency from a first wallet address of the cryptocurrency exchange to second wallet address of the provider cryptocurrency wallet 227 (e.g., associated with a financial service provider).

In some embodiments, the client wallet 242 of the computing environment 203 does not store the private key of the cryptocurrency wallet 248 of the user. However, the authorizations service 218 can prepare a cryptocurrency transaction transfer for a purchase and transmit the cryptocurrency transaction to the client device 109 to sign with its private key, which will generate a digital signature for the cryptocurrency transaction transfer. The client device 109 can submit back to the authorization service 218 the digital signature or the cryptocurrency transaction transfer with the digital signature. Afterwards, the authorization service 218 can transmit the cryptocurrency transaction transfer to the cryptocurrency blockchain 212. In other embodiments, the client wallet 22 of the computing environment 203 can store the private key of the cryptocurrency wallet 248 of the user. In some instances, the private keys of the cryptocurrency wallet 248 of the user can be stored for offline transaction scenarios.

The device identifier 236 can represent a unique identifier for the client device 109 of the user. The device identifier 236 can be a phone number, a manufacturer serial number, a unique device identifier associated with an operating system executed on the client device 109, an International Mobile Equipment Identity (IMEI) number, and other suitable unique identifiers. In some embodiments, the device identifier 236 can be linked to one or more payment tokens 233. Thus, during a transaction at a POS device 106, the computing environment 203 can transmit a request for confirmation or authorization of a funding source 114 for individual transactions.

The preferences 239 can represent configuration settings for facilitating the acceptance of funding sources 114 for the client device 109. For example, the preferences 239 can indicate a selected assignment of a particular funding source 114 for a payment token 233 or payment instrument 103. In some examples, the preferences 239 can include rules for determining the appropriate funding source 114 for a particular transaction. For instance, a transaction can be assigned a first cryptocurrency wallet, such as one involving a Europay, Mastercard, and Visa (EMV) compliant chip embedded in a payment card. A second cryptocurrency wallet can be assigned settings for an online transaction. Thus, the transaction type can be used to determine the funding source 114. As another example, the funding source 114 can be determined based at least in part on one or more rules and transaction conditions, such as the transaction category (e.g., category for goods or services), the time and date of the transaction, the transaction location, and another suitable conditions.

The merchant profile 225 can represent a merchant account for a merchant. The merchant profile 225 can include information used to receive transaction data from one or more POS devices 106 of the merchant and to provide transaction proceeds to a financial account of the merchant (e.g., via a merchant CBDC wallet address). The merchant profile 225 can include a merchant CBDC wallet 251. The merchant CBDC wallet 251 can include a wallet address or a public key for transferring digital currency to the merchant via the CBDC network 209.

The provider cryptocurrency wallet(s) 227 can represent a mechanism for storing and transferring cryptocurrency on a cryptocurrency blockchain 212 for a financial service provider. The provider cryptocurrency wallet(s) 227 can store public and private keys and a wallet address (e.g., derived from the public key) for the provider cryptocurrency wallet 227. In some examples, the authorization service 218 can facilitate a cryptocurrency transaction from the cryptocurrency wallet 248 of the user to the provider cryptocurrency wallet 227 of the financial service provider. The financial service provider can receive cryptocurrency on behalf of the merchant for a particular transaction. Then, the financial service provider can transfer the transaction proceeds to a merchant CBDC wallet 251 in a CBDC network 209. In some examples, the wallet address of the provider cryptocurrency wallet 227 can be provided to the client device 109 in order for the client device 109 to execute a blockchain transfer of the cryptocurrency transaction price to the wallet address of the provider cryptocurrency wallet 227. As such, the wallet address of the provider cryptocurrency wallet 227 (e.g., of a financial service provider) can receive the transaction payment of the item on behalf of the merchant in the form of cryptocurrency from the user at the cryptocurrency blockchain 212.

The provider CBDC wallets 230 can represent a mechanism for storing and transferring digital currency using the CBDC network 209 on behalf of a financial service provider. The provider CBDC wallets 230 can store public and private keys. In some scenarios, a provider CBDC wallet 230 can exist for individual territories or countries. For example, a first provider CBDC wallet 230 can be used for a United States central bank digital currency and a second provider CBDC wallet 230 can be used for a European Union central bank digital currency. In some examples, after receiving cryptocurrency from a cryptocurrency wallet of a user for a transaction, the authorization service 218 can transfer proceeds to a merchant CBDC wallet 251 at a CBDC network 209.

The client device 109 is representative of a plurality of client devices 109 that can be coupled to the network 215. The client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, a wearable device (e.g., smart watches, smart glasses, activity tracking devices, etc.), or other devices with like capability. In at least some embodiments, a client device 109 can also be embodied in the form of an internet of things (IoT) device, such as an internet-enabled device, like an automobile, a refrigerator, a thermostat, a light switch, or any other device connected to the internet. The client device 109 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 109 or can be connected to the client device 109 through a wired or wireless connection.

The client device 109 can include a memory for storing application data. In some embodiments, the client device 109 can include a security component 244. The security component 244 can be implemented as a hardware component, as a software component, or a combination of hardware and software. The security component 244 can store confidential payment information, identity credentials, cryptographic data (e.g., private keys), and/or potentially other confidential data. In some embodiments, the security component 244 can include a computing device that is tamper resistant, in which the computing device includes a processor and memory. In some examples, the security component 244 can be a secure element, a cryptography chip, and other cryptography hardware devices. In some instances, the hardware and/or software components used to implement a secure element can be certified by a security standards body, such as GlobalPlatform®.

The client device 109 can be configured to execute various applications such as a client application 245 or other applications. The client application 245 can be executed to interface with the authorization service 218. In some examples, the client application 245 can be associated with the computing environment 203 for a financial services provider. The client application 245 can be executed to receive and enforce instructions from the authorization service 218. The client application 245 can receive data from and provide data to the authorization service 218 during a transaction at the POS device 106 or during an online transaction.

Additionally, the client application 245 can be executed in a client device 109 to access network content served up by the computing environment 203 or other servers, thereby rendering a user interface 112 on the display. To this end, the client application 245 can include a browser, a dedicated application, or other executable applications, and the user interface 112 can include a network page, an application screen, or another user mechanism for obtaining user input. The client device 109 can be configured to execute applications beyond the client application 245 such as email applications, social networking applications, word processors, spreadsheets, or other applications.

Additionally, the client device 109 can include a cryptocurrency wallet 248 and a payment token 233. The cryptocurrency wallet 248 can be associated with a wallet address at the cryptocurrency blockchain 212. The cryptocurrency wallet 248 can include a private key. The private key can be used for generating digital signatures and for authenticating transactions that will be submitted to the cryptocurrency blockchain 212. The client device 109 can also store the wallet address of the provider cryptocurrency wallet 227. Third parties can derive a public key from the wallet address. Third parties can use the public key to verify the digital signature for a transaction.

The merchant system 206 can represent a merchant network environment for conducting point of sale transactions in person at a physical store location or online. The merchant system 206 can include the POS device 106 for in-person and online transactions. The merchant system 206 can include a merchant CBDC wallet 251 for interacting with the CBDC network 209. The merchant CBDC wallet 251 can include a wallet address associated with the merchant system 206. The wallet address can be used to derive a public key, which can be used for transmitting digital currency for transaction proceeds to the wallet address of the merchant CBDC wallet 251 at the CBDC network 209 (e.g., via a CBDC blockchain). The transfer of these transaction proceeds can be part of a settlement process.

In some embodiments, the merchant system 206 can include the POS device 106 for in-person and online transactions. The POS device 106 can include various detectors, such as a camera, a light spectrum scanner, a motion detector, a microphone, radio frequency (RF) detectors, or other types of detectors. Such detectors could be used to recognize payment instruments 103. In some embodiments, the detectors of a POS device 106 can detect a payment instrument 103 over NFC radio frequencies. In another embodiment, a POS device 106 can detect a QR code being presented using a visual detector, such a camera, a visual spectrum scanner, or other detector.

The CBDC network 209 can present an implementation of a central bank digital currency that is backed by one or more government entities. In some examples, the CBDC network 209 is implemented as a database that maintains the records of the transactions. For instance, the CBDC network 209 can be implemented as a blockchain network. In some example implementations, the CBDC network 209 can include a public blockchain, a private blockchain, a combination of private and public blockchain components, and other suitable arrangements. In some scenarios, different territories, nations, payment areas (e.g., Single Euro Payments Area) or countries may have separate CBDCs. As such, the authorization service 218 can identify a merchant CBDC wallet 251 associated with the merchant system 206.

In some cases, the transaction location can be used to identify an appropriate merchant CBDC wallet 251 in situations where the merchant system 206 has multiple merchant CBDC wallets 251. In other examples, the merchant profile 225 can include merchant preferences for identifying an appropriate CBDC network 209 for each transaction. The appropriate CBDC network 209 can be identified in the preferences based at least in part on one or more rules and one or more conditions. For example, a first rule of a particular merchant can indicate that the CBDC network 209 for Country A should be used for all transactions occurring in Country B. As another example, a second rule of a particular merchant can indicate the CBDC network 209 for Country C should be used for transactions that fall into a certain category and the transaction location is Country D.

The cryptocurrency blockchain 212 can represent a decentralized digital currency in which transactions are maintained on a blockchain network. The blockchain network can represent a distributed database that is not reliant any central authority, such as a bank or government. Some examples of cryptocurrencies can include BITCOIN®, LITECOIN®, ETHEREUM®, and other suitable cryptocurrencies.

The cryptocurrency exchange 213 can represent a platform entity that enables users to buy and sell cryptocurrency at one or more cryptocurrency blockchains 212. Each user can have a cryptocurrency account with the cryptocurrency exchange. The cryptocurrency exchange 213 can submit transactions to the cryptocurrency blockchain 212 on behalf of the user. As such, in some examples, the user does not have access to a private key and delegates cryptocurrency transaction activity to the cryptocurrency exchange 213. Thus, in some examples, the cryptocurrency exchange 213 can have a wallet address and a private key. The wallet address can be used for receiving cryptocurrency on behalf of a user, and the private key of the cryptocurrency exchange can be used for authorizing cryptocurrency transaction transfers to be sent to recipients on behalf of the user.

In some embodiments, the authorization service 218 can receive an authorization token associated with a user account at the cryptocurrency exchange 213. The authorization token can enable the authorization service 218 to make withdrawals from a particular user account. The authorization token can be restricted by the user to a time period, a transaction limit, an allocated amount of cryptocurrency, or other suitable restrictions. In some examples, the authorization service 218 can make an account withdrawal from the cryptocurrency exchange 213 because the user account was selected as a funding source for a transaction.

Figure 3:
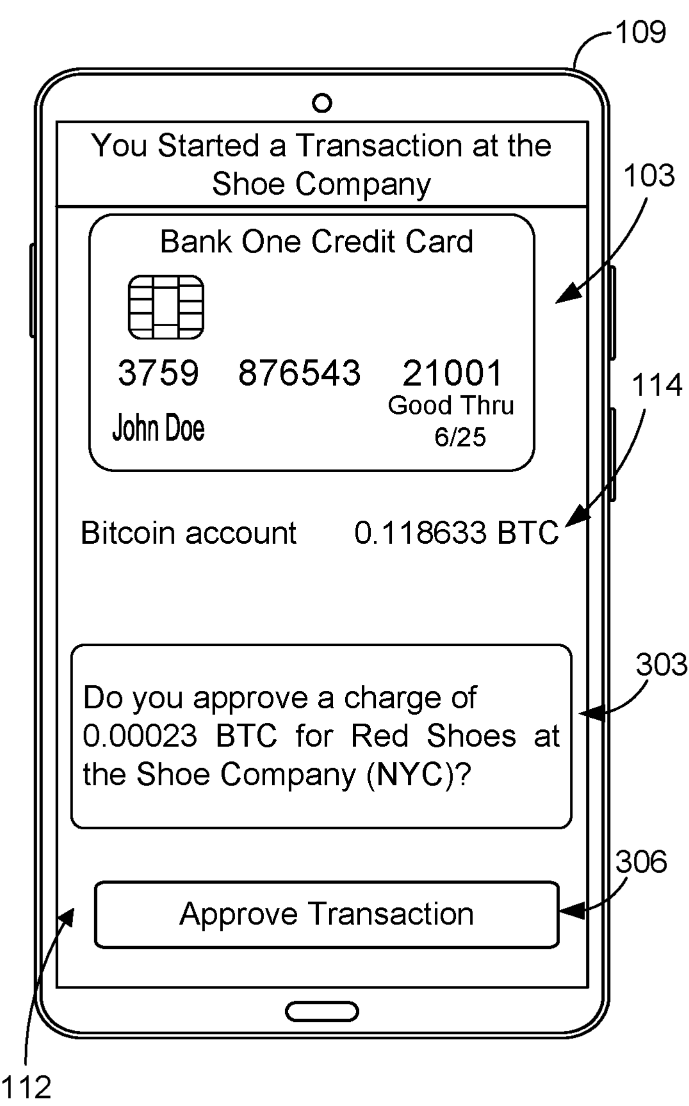
FIG. 3 is a drawing of an example user interface rendered by a client device in the network environment of FIG. 2 according to various embodiments of the present disclosure.

Next, a general description of the operation of the various components of the network environment 200 is provided. To begin, a user can decide to purchase a particular item at a physical retail store (e.g., Shoe Company in NYC as shown in FIG. 3). The user can present a payment card associated with a financial entity at a POS device 106. The POS device 106 can generate an authorization request based on the interaction with the payment card. The authorization request can include a payment token 233 extracted from the payment card. The authorization request can be transmitted to a remote computing device (e.g., a computing environment 203) associated with a financial entity. The financial entity can be an issuing bank, an acquiring bank, a credit union, a payment processor, and other suitable financial entities.

At the remote computing device, the payment token 233 can have associated preferences 239. The preferences 239 can include instructions for the remote computing device to request a selection of a funding source or request confirmation of a pre-selected funding source from the client device 109. Thus, the remote computing device can cause the client device 109 to activate a user interface prompting for receiving a selection of a funding source or for receiving confirmation of a pre-selected funding source. In a selection scenario, the user interface prompt 303 can include two or more funding sources 114. For example, the user interface prompt 303 may include three different cryptocurrency wallets, such as BITCOIN®, LITECOIN®, and ETHEREUM®. Additionally, the user interface 112 can include user interface elements for selecting an amount or a percentage to withdraw from each funding source 114. For instance, the user interface 112 can include one or more user interface sliders, user interface entry fields, and other data entry user interface components for receiving a selection of an amount for more than one funding source. In some examples, the user interface prompt 303 can include a cryptocurrency transaction price for the item for each of the different cryptocurrency wallets. Thus, the user is informed of the amount of cryptocurrency needed to purchase the item.

To continue the example, the user can select the BITCOIN® wallet account. The user interface 112 can display a second user interface to indicate that the user has selected the BITCOIN® wallet and to confirm that the user approves of the BITCOIN® transaction price for the item (e.g., FIG. 3). In some examples, the user interface 112 can also include a request for permission to make a withdrawal from the cryptocurrency wallet of the user on behalf of the user.

After receiving a confirmation of a user selection of the BITCOIN® wallet, the remote computing device can initiate a blockchain transfer on the cryptocurrency blockchain 212 for the cryptocurrency transaction price on behalf of the user. The blockchain transfer would transfer the cryptocurrency transaction price from the cryptocurrency wallet of the user to a wallet address of the provider cryptocurrency wallet 227 (e.g., financial service provider). In an alternative embodiment, the client device 109 can receive instructions to initiate the blockchain transfer of the cryptocurrency transaction price at the cryptocurrency blockchain 212. Thus, the client device 109 can cause the blockchain transfer instead of the remote computing device.

Then, the remote computing device can initiate the digital currency transfer of the transaction price to the merchant via the CBDC network 209. In some examples, the remote computing device can initiate the digital currency transfer via the CBDC after receiving a threshold quantity of blockchain confirmations from the cryptocurrency blockchain 212. In some embodiments, the remote computing device can initiate a blockchain transfer using a digital signature from a private key of the provider CBDC wallet 230 and a wallet address of the merchant CBDC wallet 251.

Referring next to FIG. 3, shown is a drawing of another example user interface 112 displayed by the client device 109. FIG. 3 illustrates an alternative user interface 112 from FIG. 1. In FIG. 3, the user interface 112 includes a depicted representation of the payment instrument 103, a listing of a particular funding source 114, a user interface prompt 303, a user interface button 306, and other suitable components.

In FIG. 3, the user interface 112 displays a second user interface 112 to indicate that the user has selected the BITCOIN® wallet or that the BITCOIN® wallet has been pre-selected. In either scenario, the user interface 112 can be used to confirm that the user approves of the BITCOIN® transaction price for the item.

In some examples, the user interface 112 displays the amount of the transaction in the chosen wallet/funding currency. The user interface 112 can also display the user's preferred currency at current best estimate daily exchange rate (e.g., in USD).

In some examples, the selection of the user interface button 306 can cause the client application 245 to sign a cryptocurrency blockchain transfer for cryptocurrency amount with a private key stored on the client device 109. In other examples, the selection of the user interface button 306 can cause the client application 245 to prepare and sign a cryptocurrency blockchain transfer. After the cryptocurrency blockchain transfer has been signed, the client application 245 can transmit it to the cryptocurrency blockchain 212.

Figure 4:
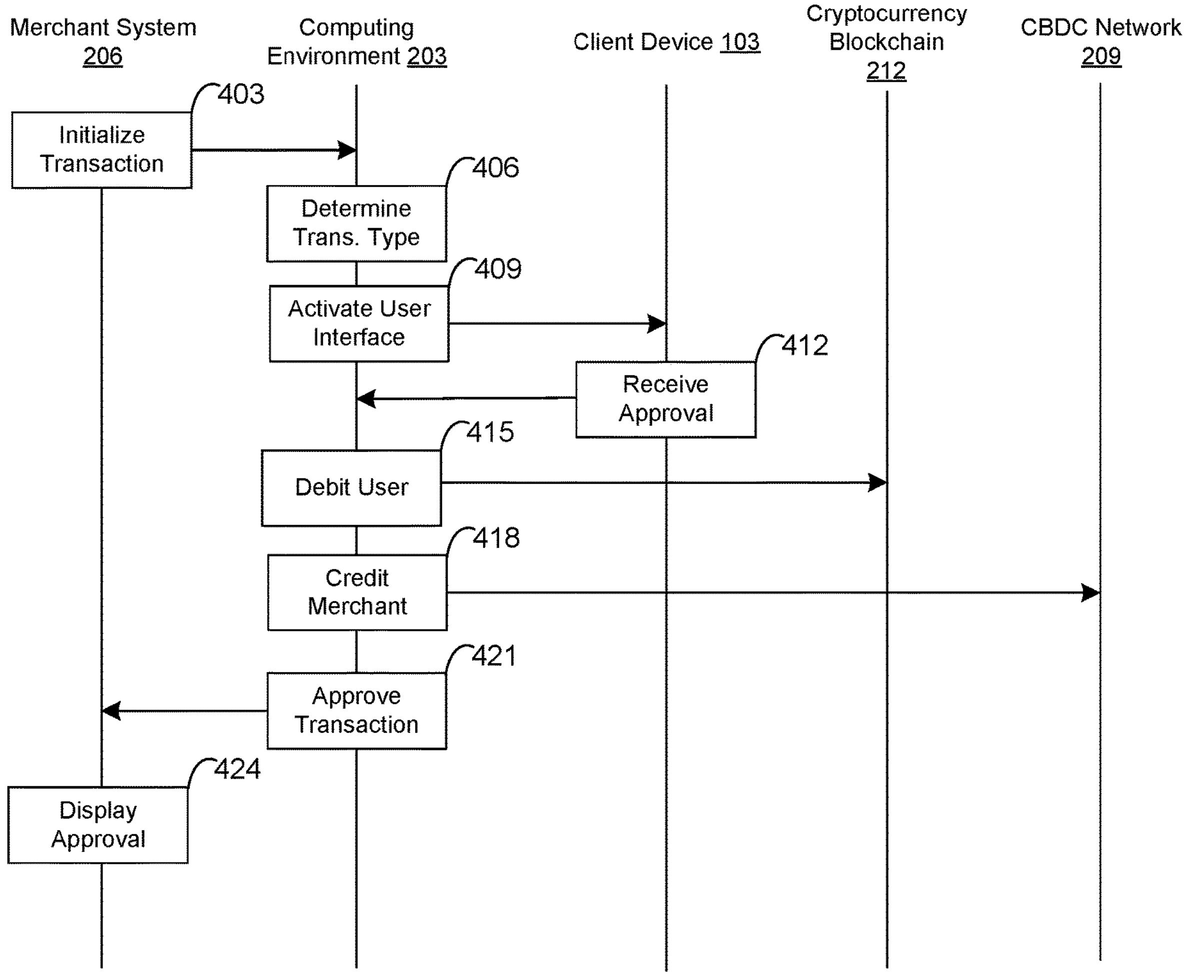
FIG. 4 is a sequence diagram illustrating an example of the interactions between the various components of the network environment of FIG. 2 according to various embodiments of the present disclosure.
Figure 4:

Moving on to FIG. 4, shown is a sequence 400 of operations performed in the network environment 200 (FIG. 2). It is understood that the sequence diagram of FIG. 4 provides merely an example of the many different types of interactions that can occur between the depicted components of the network environment 200. As an alternative, the sequence diagram of FIG. 4 may be viewed as depicting an example of elements of a method implemented in the network environment 200 (FIG. 2) according to one or more embodiments.

Beginning with box 403, the merchant system 206 can initialize a pending transaction with a payment instrument 103 of the user. The user can initiate the transaction because of a desire to purchase goods or services from a merchant. The user can present the payment instrument 103 to the POS device 106 (e.g., tapping the payment instrument 103 at the POS device 106 for a contactless transaction or inserting the payment instrument 103 into the POS device 106 for a contact transaction). The initialization of the transaction can further include the POS device 106 receiving a payment token 233 from the payment instrument 103 and transmitting an authorization request to the authorization service 218 of the computing environment 203. The authorization request can include the payment token 233, application cryptogram, payment card data, or transaction data (e.g., merchant currency for the transaction, transaction date, transaction location, transaction amount, merchant transaction category, detailed purchase information etc.).

In box 406, the computing environment 203 can identify a transaction type based at least in part on the preferences 239 associated with the payment token 233. For example, the preferences 239 can indicate that the user desires to select one of their cryptocurrency wallets as a funding source 114 for a transaction being performed with the payment instrument 103. Since a cryptocurrency wallet is going to be selected, the computing environment 203 can determine a cryptocurrency exchange for the transaction.

For example, the computing environment 203 can have a table of exchange rates for each kind of cryptocurrency. Accordingly, based at least in part on the selected cryptocurrency of the user, the exchange rate, and the transaction price, the authorization service 218 can determine a cryptocurrency transaction price (e.g., a cryptocurrency amount). In another example, the computing environment 203 can send a query for a current exchange rate to one or more cryptocurrency exchanges 213. The computing environment 203 can select one of the current exchange rates provided by one of the cryptocurrency exchanges 213.

In box 409, the computing environment 203 can transmit an activation instruction to a client device 109 associated with the payment token 233. The activation instruction can cause the client device 109 to display a user interface 112. In some examples, the user interface 112 can include multiple funding sources 114 and a request to select one of the funding sources 114. In some examples, the user interface 112 can also include a prompt to authorize the computing environment 203 to debit the selected cryptocurrency wallet.

In box 412, the client device 109 can receive a selection of one of the funding sources 114, which can also serve as permission to proceed with debiting the cryptocurrency transaction price from the funding source 114. In this example, the computing environment 203 has a private key associated with the client wallet 242 and the computing environment 203 has received permission to credit the cryptocurrency wallet on behalf of the user.

In some embodiments, the selection of the cryptocurrency wallet can cause the client device 109 to initiate the crediting of the cryptocurrency wallet. In this example, the client device 109 can receive a wallet address for the provider cryptocurrency wallet 227 or a public key of the provider cryptocurrency wallet 227. The client device 109 can use the wallet address for the provider cryptocurrency wallet 227 to submit a transaction to the cryptocurrency blockchain 212.

In box 415, the computing environment 203 can debit (e.g., an amount due or owed) the cryptocurrency transaction price at the cryptocurrency blockchain 212. Thus, the computing environment 203 can prepare a blockchain transaction transfer for the cryptocurrency transaction price. The blockchain transaction transfer can be signed by the user using a private key stored in the client device 109.

Afterwards, the computing environment 203 can transmit the blockchain transaction transfer to the cryptocurrency blockchain 212. The blockchain transaction transfer can transfer the cryptocurrency transaction price from the cryptocurrency wallet 248 of the user to the provider cryptocurrency wallet 227 of the provider. In other alternative examples, the computing environment 203 can make a withdrawal from the cryptocurrency exchange 213 for the cryptocurrency transaction price using an authorization token associated with a user account at the cryptocurrency exchange. In some instances, the withdrawal involves the cryptocurrency exchange 213 submitting a blockchain transaction transfer to the cryptocurrency blockchain 212, which would transfer cryptocurrency to the wallet address of the provider cryptocurrency wallet 227.

In box 418, the computing environment 203 can credit (e.g., incoming funds allocated) the transaction price (e.g., in a digital currency of the CBDC network 209) to the merchant CBDC wallet 251. In some examples, the computing environment 203 can transmit a CBDC transfer to the CBDC network 209 based at least in part on receiving or identifying a threshold quantity of blockchain confirmations from the cryptocurrency blockchain 212. Additionally, prior to initiating the CBDC transfer, the computing environment 203 can identify a CBDC network 209 for receiving transaction proceeds. For example, although a transaction is occurring in Mexico, the merchant system 206 can set a merchant preference for receiving transaction proceeds using a CBDC network 209 for the United States.

In box 421, the computing environment 203 can transmit a transaction approval notification to the merchant system 206, in which the transaction approval notification can be provided to the POS device 106. In some examples, the transaction approval notification can be transmitted in response to receiving a threshold quantity of CBDC blockchain confirmations from the blockchain for the CBDC network 209. In some examples, the computing environment 203 can transmit a transaction approval notification to the client device 109.

In box 424, the merchant system 206, such as the POS device 106, can indicate that the transaction has been authorized or approved. In some embodiments, the merchant system 206 can transmit a transaction authorization or approval notification to the client device 109, such as for example, in an online transaction.

Figure 5:
FIG. 5 is a flowchart illustrating one example of functionality implemented as portions of an application executed in a computing environment in the network environment of FIG. 2 according to various embodiments of the present disclosure.
Figure 5:
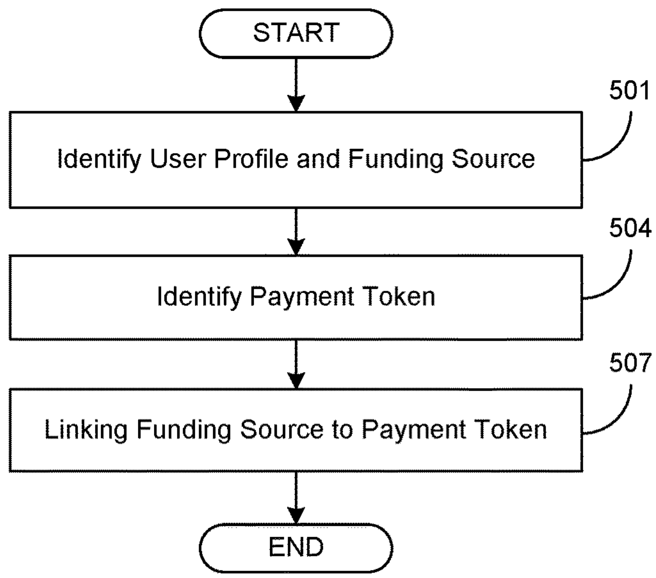

Referring next to FIG. 5, shown is a flowchart that provides one example of the operation of a portion of the authorization service 218. The flowchart of FIG. 5 provides merely an example of the many different types of functional arrangements that can be employed to implement the operation of the depicted portion of the authorization service 218. As an alternative, the flowchart of FIG. 5 can be viewed as depicting an example of elements of a method implemented within the network environment 200.

Beginning with box 501, the authorization service 218 can identify a user profile 224 and a funding source 114 for the user profile 224. The authorization service 218 can display one or more user interfaces 112 on a client device 109 for identifying one or more funding sources 114. In some examples, the authorization service 218 can receive permission (e.g., an authorization token) to make a withdrawal from a funding source 114 (e.g., a user account at the cryptocurrency exchange 213) on behalf of the user. In some instances, the computing environment 203 can get a digital signature for a blockchain transaction transfer from the client device 109. For example, the authorization service 218 can generate a blockchain transaction transfer for the cryptocurrency transaction price and submit the blockchain transaction transfer to the client device 109 for a digital signature. After the client device 109 signs the blockchain transaction transfer with a private key, the client device 109 can submit the digital signature and the blockchain transaction transfer to the authorization service 218, which can then submit the transaction transfer to the cryptocurrency blockchain 212.

In box 504, the authorization service 218 can identify a payment token 233 for the user profile 224. In some examples, the authorization service 218 can receive preferences 239 for transaction activity of the payment token 233. The preferences 239 can include rules for determining which funding source 114 to select based at least in part on one or more conditions (e.g., transaction type, transaction amount, payment token being used, etc.).

In box 507, the authorization service 218 can link one or more of the funding sources 114 to one or more of the payment tokens 233. The linkage can also include storing preferences 239 (e.g., rules, transaction types, authorization tokens, etc.) associated with the funding source 114. For example, a first preference 239 can include linking a first payment token 233 (e.g., a smart watch) to a first cryptocurrency wallet and linking a second payment token 233 (e.g., a payment card) to a second cryptocurrency wallet. In another example, a second preference 239 can include displaying a user interface 112 for the selection of the funding source 114 during a pending transaction (FIG. 1).

Figure 6:
FIG. 6 is a flowchart illustrating one example of functionality implemented as portions of an application executed on a client device in the network environment of FIG. 2 according to various embodiments of the present disclosure.
Figure 6:
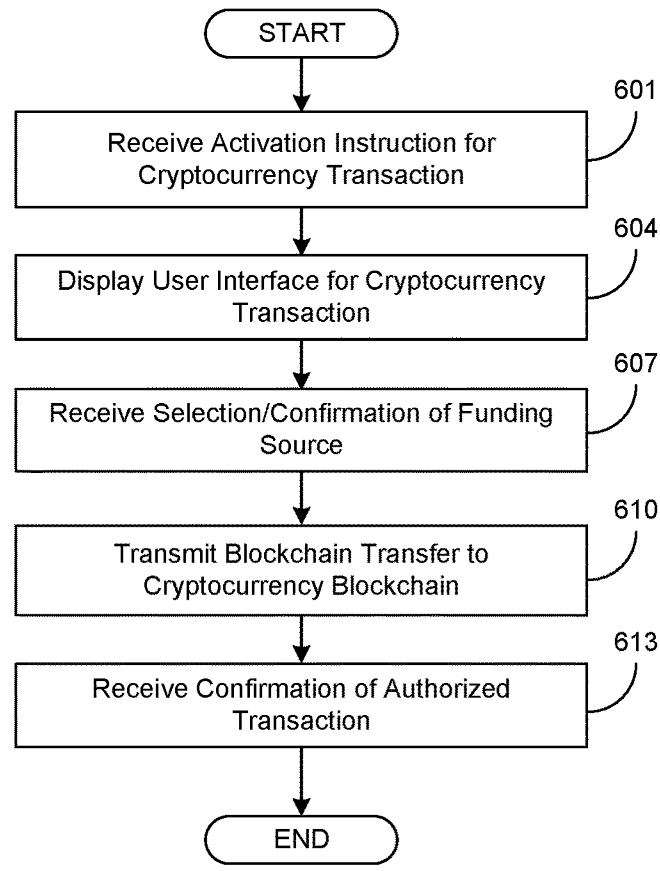

Referring next to FIG. 6, shown is a flowchart that provides one example of the operation of a portion of the client application 245. The flowchart of FIG. 6 provides merely an example of the many different types of functional arrangements that can be employed to implement the operation of the depicted portion of the client application 245. As an alternative, the flowchart of FIG. 6 can be viewed as depicting an example of elements of a method implemented within the network environment 200.

In box 601, the client application 245 can receive an activation instruction from the authorization service 218 of the computing environment 203. The activation instruction can include transaction data from the POS device 106, funding sources 114, preferences 239, and other suitable data. For example, the activation instruction can be provided in order to get confirmation of a pre-selected funding source 114 or to get a selection of one of the funding sources 114. The activation instruction can be enforced or implemented by the client application 245. In some examples, the client application 245 is associated with the computing environment 203.

In box 604, the client application 245 can display the user interface 112 for the cryptocurrency transaction. In some examples, the user interface 112 can display transaction data, such as the merchant information, products or services associated with the transaction, transaction location, merchant transaction price, and other suitable data. The user interface 112 can also include a cryptocurrency transaction price for one or more cryptocurrency wallets in the funding source 114. In some instances, the user interface 112 can display an account balance for one or more of the funding sources 114 (e.g., FIGS. 1 and 3) and a representation of the payment token 233 (e.g., a payment instrument 103).

In box 607, the client application 245 can receive a selection or confirmation of the funding source 114 from the user interface 112. In some embodiments, the client application 245 can transmit to the authorization service the confirmation or the selection of the funding source 114. In some instances, the client application 245 can transmit the private key to the authorizations service 218.

In box 610, the client application 245 can transmit the blockchain transfer to the cryptocurrency blockchain 212. In some embodiments, the client application 245 can first generate the blockchain transfer and sign the blockchain transfer with a private key associated with the cryptocurrency wallet 248. The client application 245 can be provided the wallet address of the provider cryptocurrency wallet 227 the provider cryptocurrency wallet 227.

In other embodiments, the authorization service 218 can execute the blockchain transfer on behalf of the client device 109. In these embodiments, the authorization service 218 can have access to the private key for the cryptocurrency wallet 248 of the client device 109. For instance, the client application 245 can provide the private key and authorization to use the private key.

In box 613, the client application 245 can receive confirmation for the authorization of the cryptocurrency transaction. The confirmation can be received from the authorization service 218 and/or the cryptocurrency blockchain 212.

Figure 7:
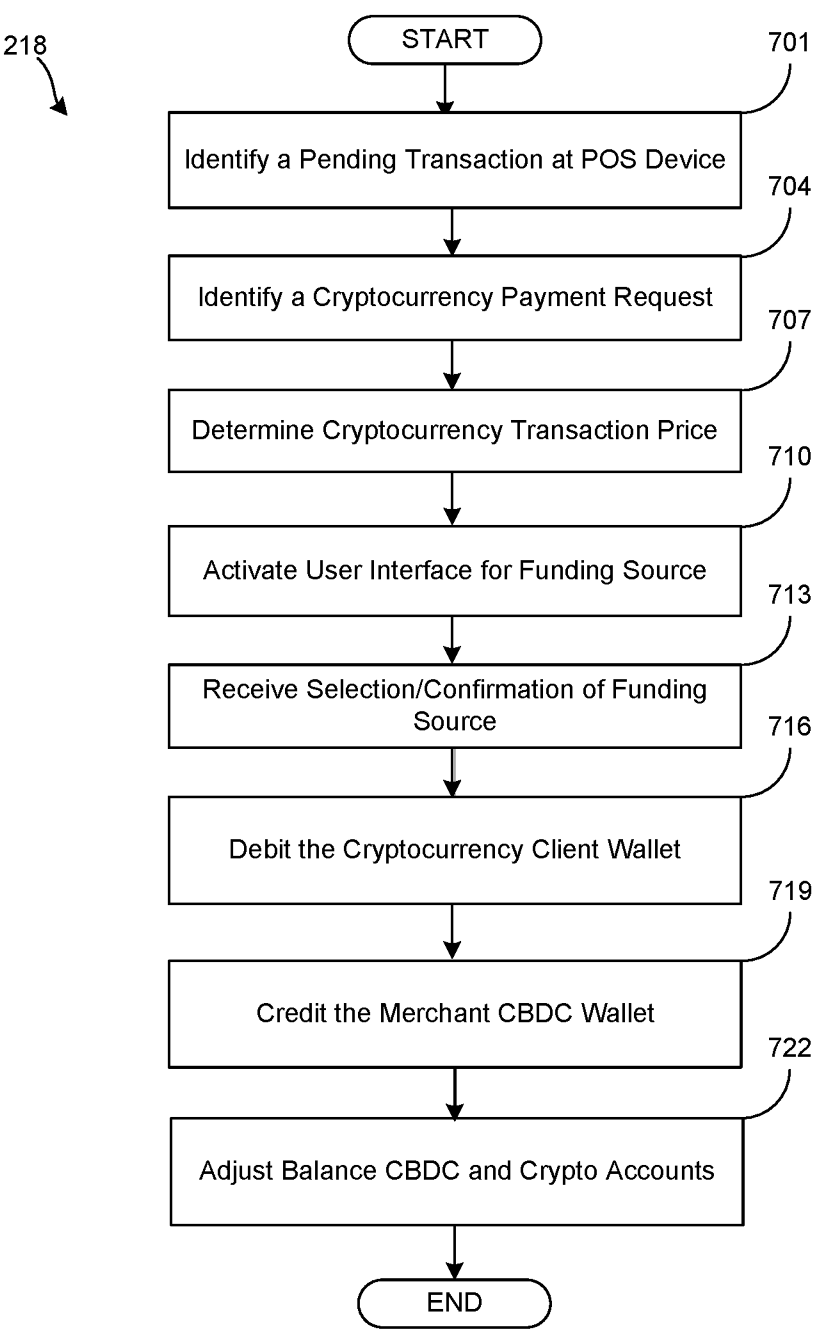
FIG. 7 is a flowchart illustrating one example of functionality implemented as portions of an application executed in a computing environment in the network environment of FIG. 2 according to various embodiments of the present disclosure.

Referring next to FIG. 7, shown is a flowchart that provides one example of the operation of a portion of the authorization service 218. The flowchart of FIG. 7 provides merely an example of the many different types of functional arrangements that can be employed to implement the operation of the depicted portion of the authorization service 218. As an alternative, the flowchart of FIG. 7 can be viewed as depicting an example of elements of a method implemented within the network environment 200.

In box 701, the authorization service 218 can identify a pending transaction at a POS device 106. The pending transaction can be identified from an authorization request that was transmitted by the POS device 106. The authorization request can include a payment token 233 or transaction data (e.g., merchant information, product or service information, transaction price, etc.).

In box 704, the authorization service 218 can identify a cryptocurrency payment request for the pending transaction. In some embodiments, the cryptocurrency payment request can be identified based at least in part on the preferences 239 associated with the payment token 233. For example, the preferences 239 can indicate when transactions are executed with the payment token 233, then the authorization service 218 is to request a selection of the funding source 114 or a confirmation of a pre-selected funding source 114.

In box 707, the authorization service 218 can determine a cryptocurrency transaction price. In some scenarios, the authorization service 218 can determine the cryptocurrency transaction price for one or more cryptocurrencies based at least in part on a cryptocurrency exchange rate. The cryptocurrency exchange rate can be valid for a preselected time period. For instance, the cryptocurrency exchange rate can be updated on an hourly basis. In other instances, the cryptocurrency exchange rate can be determined on demand in real-time.

In box 710, the authorization service 218 can activate a user interface on the client device 109 for a funding source 114 selection or confirmation. The authorization service 218 can transmit to the client device 109 an activation instruction. The client device 109 can be identified based at least in part on the payment token 233. In some examples, the payment token 233 can be associated with the client device 109 in the user profile 224. In other embodiments, the preferences 239 can include a rule for transmitting the activation instruction to one or more client devices 109 in the user profile 224 based at least in part on certain conditions (e.g., transaction type, location, transaction category) identified in transaction data from the authorization request. For instance, a smart watch may be identified as the client device 109 for receiving activation instructions for transaction less than a threshold amount (e.g., transaction less than $100).

In box 713, the authorization service 218 can receive a selection or confirmation of the funding source 114 from the client device 109. For example, the selection can refer to a user selection one of the funding sources 114. Alternatively, the confirmation can refer to the user confirming on the client device 109 that the pre-selected funding source 114 is approved for the particular transaction. In some examples, in response to the selection, the authorization service 218 can receive a wallet address for the provider cryptocurrency wallet 227 or a public key for the provider cryptocurrency wallet 227.

In box 716, the authorization service 218 can cause the debiting of the cryptocurrency wallet 248 of the client device 109. In some examples, in response to receiving the confirmation or selection of a funding source 114, the authorization service 218 can submit a blockchain transfer to the cryptocurrency blockchain 212. In this scenario, the authorization service 218 has obtained permission to initiate the blockchain transfer on behalf of the client device 109. In some examples, the authorization service 218 can obtain an authorization token associated with the user of the client device 109 at the cryptocurrency exchange 213. The authorization token 218 can enable the authorization service 218 to make a withdrawal request (e.g., for the cryptocurrency transaction price) at a user account of the cryptocurrency exchange 213. In some instances, the withdrawal request can cause the cryptocurrency exchange 213 to transmit a blockchain transfer to the wallet address of the provider cryptocurrency wallet 227. In other scenarios, the authorization service 218 can prepare a cryptocurrency blockchain transfer and request the user of the client device 109 sign the cryptocurrency blockchain transfer with a private key.

Figure 8:
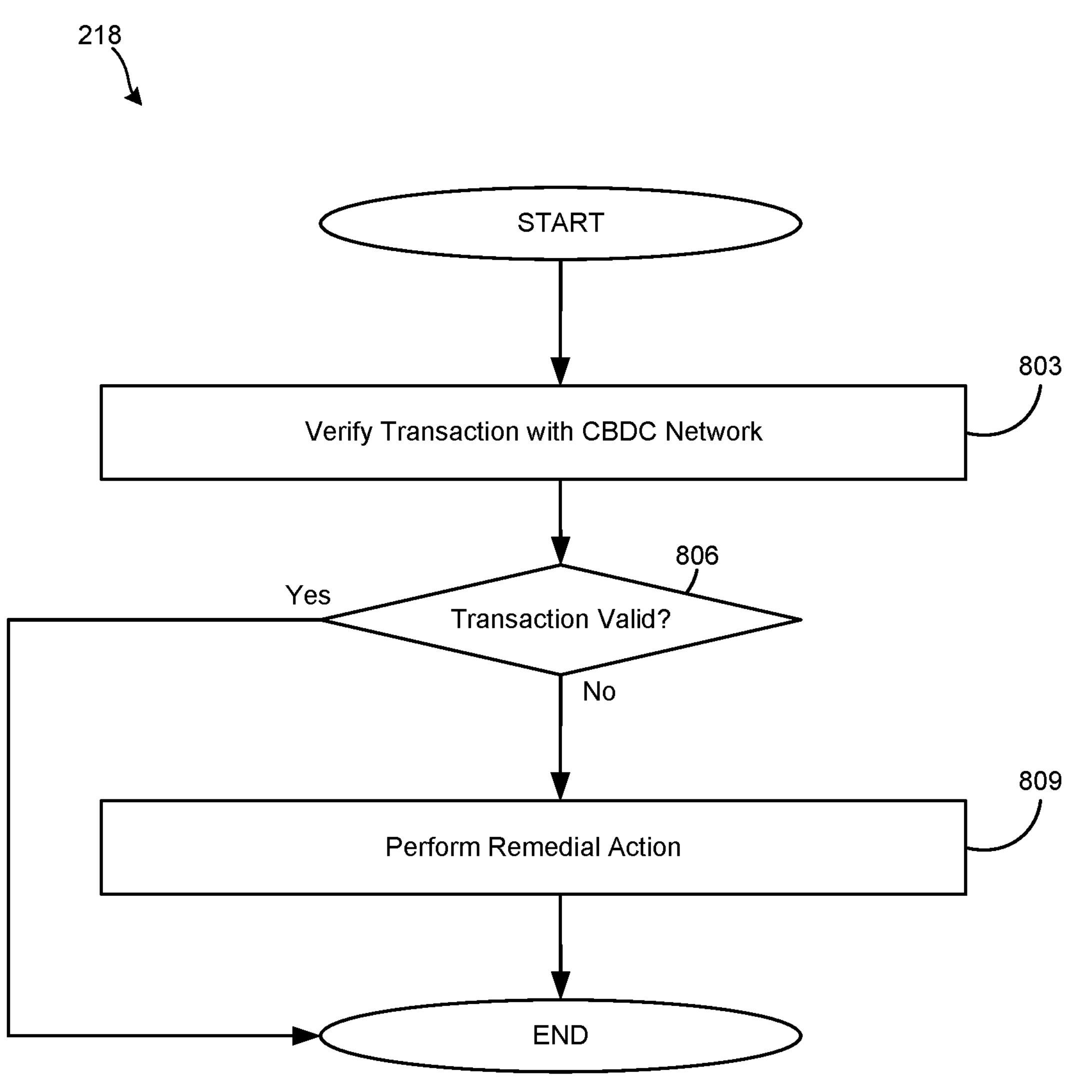
FIG. 8 is a flowchart illustrating one example of functionality implemented as portions of an application executed in a computing environment in the network environment of FIG. 2 according to various embodiments of the present disclosure.

Referring next to FIG. 8, shown is a flowchart that provides one example of the operation of a portion of the authorization service 218. The flowchart of FIG. 8 provides merely an example of the many different types of functional arrangements that can be employed to implement the operation of the depicted portion of the authorization service 218. As an alternative, the flowchart of FIG. 8 can be viewed as depicting an example of elements of a method implemented within the network environment 200.

Beginning with block 803, the authorization service 218 can verify a transaction with the CBDC network 209. In at least one embodiment, the CBDC network 209 can send a confirmation of the transaction in response to receiving the transmitted transaction (e.g., block 722). In such an embodiment, the response from the CBDC network 209 can include a message and/or a response code that indicates the status of the transaction. In at least another embodiment, the authorization service 218 can send a query to the CBDC network 209 to determine whether the transaction has been completed.

In at least one embodiment, the authorization service 218 can directly query the CBDC network 209 about a specific transaction. In at least one embodiment, the authorization service 218 can direct the client device 109 to query the CBDC network 209 and request a return of the response. In at least one embodiment, the authorization service 218 can direct the merchant system 206 to query the CBDC network 209 and request a return of the response. In some embodiments, the transaction batch processing can be non-instantaneous (e.g., a block is written to a CBDC blockchain every ten minutes) and verification can be difficult to determine. In such an embodiment, the authorization service 218 can front the funds to the payee on behalf of the payor to ensure that instantaneous commerce can be performed as expected.

Next, at block 806, the authorization service 218 can determine if the transaction is valid. In at least one embodiment, the authorization service 218 can determine if the transaction is valid by inspecting a response code and/or a response message received during the verification of block 803. A response code can include numbers, letters, or characters which uniquely identify a specific type of response. For example, a response code of "404" could be used to identify that a destination wallet address is not found. In at least some embodiments, the response codes could correspond to credit card issuer response codes.

For instance, "00" could correspond to "Issuer system unavailable;" "01" could correspond to "refer to issuer;" "05" could correspond to "do not honor;" "12" could correspond to "invalid transaction;" "65" could correspond to "activity limit exceeded;" and other various transaction codes used by card issuers. These response codes can correspond to common transaction responses, like transaction completed, transaction pending, insufficient funds in the source account, the destination is not found, funds were not able to be drawn from the source account, limits have been reached, etc. Based on the response code and/or response message, the authorization service 218 can decide whether the transaction was completed and successful or if the transaction failed in any way. If the transaction was completed, the flowchart of FIG. 8 ends. If the transaction failed in any way, the process can continue to block 809.

At block 809, the authorization service 218 can perform a remedial action. In at least some embodiments, the authorization service 218 can attempt to retry the CBDC transfer as a remedial action. In at least another embodiment, the authorization service 218 can modify the generated CBDC transfer, before it is sent to the CBDC network 209, to include or modify a value to indicate that this request is a unique CBDC transfer. When the authorization service 218 attempts to perform the CBDC transfer again, the process can return to block 803 to verify the transaction with the CBDC network 209.

In at least another embodiment, the authorization service 218 can send a message to the client device 109 as a remedial action. In at least one embodiment, the message sent to the client device 109 can include a request to fix an issue with the transaction. In at least another embodiment, the message sent to the client device 109 can be used to notify the client device 109 that the CBDC transfer has failed. In at least another embodiment, the message can include content indicating that the CBDC network 209 is not available, and another payment method is required.

In at least another embodiment, the authorization service 218 can send a message to the POS device 106 as a remedial action. In at least one embodiment, the message sent to the POS device 106 can include a request to fix an issue with the transaction. In at least another embodiment, the message sent to the POS device 106 can be used to notify the POS device 106 that the CBDC transfer has failed. In at least another embodiment, the message can include content indicating that the CBDC network 209 is not available, and another payment method is required.

In at least another embodiment, the authorization service 218 can identify that CBDC network 209 is failing to respond or rejecting a plurality of CBDC transfers for a period of time and determine that the CBDC network 209 is experiencing a failure. In such an embodiment, the authorization service 218 can send a message to the client device 109 as a remedial action to warn that the CBDC network 209 is experiencing a failure scenario. In such a situation, if the authorization service 218 includes preferences for the payee to receive funds at a secondary account, the authorization service 218 can re-route the CBDC transfer to a secondary funding source. In another embodiment, the authorization service 218 can direct the client device 109 to cease any future microtransactions being requested, which may limit the experience of the end-user.

In another embodiment, the authorization service 218 can initiate a refund of the CBDC transfer as a remedial action. In at least some examples, microtransactions can be utilized for more consumable items or consumable services for which returns on the CBDC transfer are not common. However, some embodiments of microtransactions could be more conducive to having a returns process. For instance, in an example where a digital movie streaming company charges a small fee (pennies, nickels, dimes, etc.) for each period of time (minute, 5 minutes, 10 minutes, etc.) of the content that is watched, if the digital movie streaming company's servers failed at any point during the streaming of the movie, then the total experience will have been destroyed for the consumer. In such a situation, a refund process can be recognized by the authorization service 218 and be further executed according to various procedures. Once the authorization service 218 has performed the remedial action, the flowchart of FIG. 8 ends.

In other example implementations, the client device 109 can receive the transaction data from the authorization service 218 and the client device 109 can prepare the cryptocurrency blockchain transfer. The client device 109 can sign the cryptocurrency blockchain transfer with a private key associated with the cryptocurrency wallet 248.

The client device 109 can transmit the cryptocurrency blockchain transfer to the cryptocurrency blockchain 212.

In box 719, the authorization service 218 can cause the crediting of the merchant CBDC wallet 251 in the transaction price for the item in a digital currency (e.g., using a CBDC network 209). At this stage, the transaction price can represent the original sales price, the original sales price converted to a digital currency at a CBDC network 209 selected by the merchant, and other suitable options.

The authorization service 218 can use the wallet address of the merchant CBDC wallet 251 and the private key of the provider CBDC wallet 230 to prepare the CBDC blockchain transaction. The authorization service 218 can sign the CBDC blockchain transaction with its private key (e.g., of the financial service provider) and submit the CBDC blockchain transaction to the CBDC network 209. The authorization service 218 can identify a merchant CBDC wallet 251 according to merchant preferences. For example, although a transaction with the user occurred in Thailand, the merchant can set preferences to receive the transaction price in the U.S. CBDC network 209. In some examples, the authorization service 218 can initiate the crediting in response to receiving a threshold quantity of blockchain confirmations from the cryptocurrency blockchain 212.

In box 722, the authorization service 218 can adjust the balance associated with the provider CBDC wallet 230 and/or the provider cryptocurrency wallet 227. In some examples, the authorization service 218 can determine at specific time periods or when certain balance thresholds are met to adjust the balances of the provider CBDC wallet 230 and/or the provider cryptocurrency wallet 227. For example, the provider may accumulate a significant amount of a particular cryptocurrency. The authorization service 218 can automatically exchange portions of the cryptocurrency at certain times. In some examples, this adjustment of the balances can be omitted.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), quantum random access memory (QRAM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram of FIG. 4 and the flowcharts of FIGS. 5-7 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagram of FIG. 4 and the flowcharts of FIGS. 5-7 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagram of FIG. 4 and the flowcharts of FIGS. 5-7 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and machine-readable instructions stored in the memory that, when executed by the processor, cause the computing device to at least:

identify an authorization request for a pending transaction of an item, the pending transaction comprising a first token and a transaction amount;

determine a device identifier associated with the first token;

determine a cryptocurrency amount for the item based at least in part on an exchange rate;

activate a user interface on a client device associated with the device identifier by transmitting an activation instruction to the client device based at least in part on a stored preference for the first token indicating a solicitation request is to be transmitted to the client device, the activation instruction comprising a funding source, the user interface comprising a request to accept the cryptocurrency amount for the item;

receive an approval of the cryptocurrency amount from the client device, the approval comprising a first digital signature for authenticating the pending transaction;

verify the first digital signature using a public key associated with a wallet address of the client device;

transmit an instruction to a cryptocurrency exchange for a withdrawal of the cryptocurrency amount based at least in part on the approval, the instruction comprising a second token of a user account;

generate a second digital signature for a blockchain transfer for the transaction amount based at least in part on a private key associated with a provider central bank digital currency (CBDC) wallet; and transmit the blockchain transfer for the transaction amount to a central bank digital currency (CBDC) blockchain network based at least in part on a confirmation of the withdrawal of the cryptocurrency amount.

2. The system of claim 1, wherein the machine-readable instructions, when executed by the processor, further cause the computing device to at least:

transmit an authorized transaction notification to a point-of-sale (POS) device in response to a receipt of a confirmation of the withdrawal of the cryptocurrency amount.

3. The system of claim 1, wherein the activation of the user interface on the client device further causes the computing device to at least:

transmit an activation command to an application executed on the client device, the activation command comprises an instruction to display the cryptocurrency amount and transaction data for the pending transaction of the item.

4. The system of claim 1, wherein the exchange rate is determined based at least in part on at least one of a time period within a day of the pending transaction or a cryptocurrency exchange rate table for a cryptocurrency type.

5. The system of claim 1, wherein the transmission of the blockchain transfer of the transaction amount to the CBDC blockchain network is further based at least in part on a receipt of a threshold quantity of blockchain confirmations from a cryptocurrency blockchain network.

6. The system of claim 1, wherein the pending transaction is received from a point of sale (POS) device.

7. The system of claim 1, wherein receipt of the approval of the cryptocurrency amount from the client device comprises a selection of a cryptocurrency type from a plurality of cryptocurrency types.

8. A method, comprising:

identifying, by a computing device, an authorization request for a pending transaction of an item, the pending transaction being received from a point of sale (POS) device, the pending transaction comprising a first token and a transaction amount;

determining, by the computing device, a device identifier associated with the first token, the device identifier being associated with a client device;

determining, by the computing device, a cryptocurrency amount for the item based at least in part on an exchange rate;

activating, by the computing device, a user interface on the client device associated with the device identifier by transmitting an activation instruction to the client device based at least in part on a stored preference for the first token indicating a solicitation request is to be transmitted to the client device, the activation instruction comprising a funding source, the user interface comprising a request to accept the cryptocurrency amount for the item;

receiving, by the computing device, an approval of the cryptocurrency amount from a client device associated with the first token, the approval comprising a first digital signature for authenticating the pending transaction;

verifying, by the computing device, the first digital signature using a public key associated with a wallet address of the client device;

transmitting, by the computing device, an instruction to a cryptocurrency exchange for a withdrawal of the cryptocurrency amount based at least in part on the approval, the instruction comprising a second token of a user account;

generating, by the computing device, a second digital signature for a blockchain transfer for the transaction amount based at least in part on a private key associated with a provider central bank digital currency (CBDC) wallet; and transmitting, by the computing device, the blockchain transfer of the transaction amount in a digital currency to a central bank digital currency (CBDC) blockchain network based at least in part on a confirmation of the withdrawal of the cryptocurrency amount.

9. The method of claim 8, further comprising:

transmitting, by the computing device, an authorized transaction notification to the POS device in response to a confirmation of the withdrawal of the cryptocurrency amount.

10. The method of claim 8, wherein the CBDC blockchain network is selected among a plurality of CBDC networks based at least in part on a merchant profile.

11. The method of claim 8, wherein the approval of the cryptocurrency amount is received by:

transmitting, by the computing device, an activation instruction to the client device to display a user interface, the user interface comprising a request to accept the cryptocurrency amount.

12. The method of claim 8, wherein the approval of the cryptocurrency amount is received by:

transmitting, by the computing device, an activation command to an application of a provider executed on the client device, the activation command comprises an instruction to display the cryptocurrency amount and transaction data for the pending transaction of the item.

13. The method of claim 8, wherein the exchange rate is determined based at least in part on at least one of a time period within a day of the pending transaction or a cryptocurrency exchange rate table for a cryptocurrency type.

14. The method of claim 8, wherein the approval of the cryptocurrency amount is received by:

transmitting, by the computing device, an activation command to an application of a provider executed on the client device, the activation command comprises an instruction to display the cryptocurrency amount for each of a plurality of cryptocurrency types; and receiving, by the computing device, a selection of one of the plurality of cryptocurrency types.

15. A system, comprising:

a computing device comprising a processor and a memory; and machine-readable instructions stored in the memory that, when executed by the processor, cause the computing device to at least:

receive an activation instruction for a selection request of a funding source for an item from a remote computing device of a provider, the selection request being associated with a payment instrument presented at a point of sale (POS) device;

display a user interface that includes a cryptocurrency amount of the item and transaction data associated with a pending transaction for the item based at least in part on the activation instruction for the selection request, the cryptocurrency amount being displayed based at least in part on a plurality of cryptocurrency wallets being linked as a funding source for the payment instrument presented to the POS device, the user interface indicating the payment instrument presented to the POS device;

identify a selection of the cryptocurrency amount for a selected cryptocurrency wallet among the plurality of cryptocurrency wallets displayed in the user interface;

generate a digital signature for a blockchain transfer using a private key of the selected cryptocurrency wallet associated with the computing device based at least in part on the cryptocurrency amount, wherein the digital signature is verified using a public key associated with the private key; and cause the blockchain transfer for the cryptocurrency amount to be transmitted to a cryptocurrency blockchain based at least in part on the cryptocurrency amount and the selected cryptocurrency wallet.

16. The system of claim 15, wherein the cryptocurrency wallet is associated with a wallet address at the cryptocurrency blockchain.

17. The system of claim 15, wherein the user interface comprises the cryptocurrency amount for each of the plurality of cryptocurrency wallets.

18. The system of claim 17, wherein the selected cryptocurrency wallet is associated with a wallet address at the cryptocurrency blockchain.

19. The system of claim 15, wherein the blockchain transfer is caused by machine-readable instructions that, when executed by the processor, further cause the computing device to at least:

provide to the remote computing device a token that enables the remote computing device to make a withdrawal from a user account at a cryptocurrency exchange.

20. The system of claim 15, wherein the computing device comprises a hardware security component for storing the private key.

* * * * *